US007789300B2

(12) United States Patent
Fakhri

(10) Patent No.: US 7,789,300 B2
(45) Date of Patent: Sep. 7, 2010

(54) SYSTEM AND METHOD FOR MANAGING COMPUTER MEDIA IN A SECURE ENVIRONMENT

(76) Inventor: Omar J. Fakhri, c/o Juneau Partners P.O. Box 2516, Alexandria, VA (US) 22301

( * ) Notice: Subject to any disclaimer, the term of this patent is extended or adjusted under 35 U.S.C. 154(b) by 869 days.

(21) Appl. No.: 11/677,581

(22) Filed: Feb. 21, 2007

(65) Prior Publication Data

US 2009/0321514 A1 Dec. 31, 2009

Related U.S. Application Data

(60) Provisional application No. 60/744,648, filed on Feb. 21, 2006.

(51) Int. Cl.

*G06F 7/08* (2006.01)
*G06K 5/00* (2006.01)
*G06K 7/01* (2006.01)
*G06F 17/00* (2006.01)

(52) U.S. Cl. .................... 235/381; 235/382; 235/382.5; 700/231; 700/237

(58) Field of Classification Search ................. 235/381, 235/382, 382.5; 700/231, 237

See application file for complete search history.

(56) References Cited

U.S. PATENT DOCUMENTS

| | | | | |
|---|---|---|---|---|
| 5,303,844 | A * | 4/1994 | Muehlberger | 221/1 |
| 5,748,485 | A * | 5/1998 | Christiansen et al. | 700/234 |
| 7,412,601 | B2 * | 8/2008 | Shibata et al. | 713/161 |
| 2002/0062171 | A1 * | 5/2002 | Tseng et al. | 700/231 |
| 2002/0112172 | A1 * | 8/2002 | Simmons | 713/193 |
| 2002/0154905 | A1 * | 10/2002 | Maeda et al. | 396/2 |
| 2005/0257259 | A1 * | 11/2005 | Torre-Bueno | 726/17 |
| 2009/0166375 | A1 * | 7/2009 | Butler et al. | 221/282 |

* cited by examiner

*Primary Examiner*—Daniel Walsh
(74) *Attorney, Agent, or Firm*—Todd L. Juneau

(57) ABSTRACT

The field of the invention relates to systems and methods for handling CD, USB media storage, etc. within a secure environment like the FBI, various intelligence agencies, the military, and so forth.

6 Claims, 1 Drawing Sheet

SYSTEM AND METHOD FOR MANAGING COMPUTER MEDIA IN A SECURE ENVIRONMENT

CROSS REFERENCE TO RELATED APPLICATIONS

This application claims priority benefit of U.S. provisional Ser. No. 60/774,648, filed Feb. 21, 2006, entitled Electronic media dispensing and tracking system with integrated personnel security identification, the contents of which are incorporated herein in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The field of the invention relates to systems and methods for handling CD, USB media storage, etc. within a secure environment like the FBI, various intelligence agencies, the military, and so forth.

The availability and power of various media storage devices and disks generates a problem of controlling and managing information within an organization. This problem is amplified within secure environments such as law enforcement, military, and other environments where classified, confidential, secret, top secret, or SCI information is stored, created, and managed. Many examples of espionage may have been averted or deterred if a secure system had been in place.

BRIEF SUMMARY OF THE INVENTION

A system for managing and controlling storage media within a secure environment, comprising: a) at least one CD vending machine within said environment; b) Access control badge system widely used in industry and government facilities used to control and monitor access; c) Shredding machines used to destroy all classifications of CDs; and, d) Bar-coding technology, wherein the vending machine is loaded with bar-coded pre-labeled CDs and dispenses blank CD labeled as Unclassified, Confidential, Secret, Top Secret, and SCI, and wherein to withdraw the CDs a user employee uses their security access badge (tied into the central security system) and PIN to authenticate and wherein the employee's badge credentials are tied into the level of CD allowed to withdraw from the system, and wherein a central security system will keep track of how many CDs any particular employee has and keeps information about the date/time of the withdrawal along with what vending machine it was drawn from.

The system also includes wherein once the CD is no longer needed and must be destroyed then a CD destruction/transfer kiosk is used, and wherein the destruction/transfer kiosk authenticates using the security badge/PIN, and wherein the system knows what particular CD(s) that employee has and asks which CD they wish to transfer to another employee or destroy, and wherein if they wish to transfer it to another employee it'll ask that the other employee to also authenticate (Badge and PIN), and prompts them to place the CD into the bar code reading box, and wherein once the CD is in the box the door locks and the barcode is read, and wherein if the new owner doesn't have a high enough security clearance to accept that level of CD the system won't allow the transaction, and wherein if the person has the appropriate clearance then ownership will be transferred and the kiosk's credit-card-type-printer prints a hardcopy of the transaction for both individuals.

The system also includes wherein if the intention is to destroy the CD then the validated owner places the CD in the destruction hopper and shuts the door, and wherein the door locks and reads the CD, and wherein if the CD doesn't belong to the owner then the door unlocks and the system tells the user who the rightful owner is (with phone number) and instructs them to return it.

The system also includes wherein the system can also generate an automated phone call to the rightful owner telling them that so-in-so just tired to destroy one their CDs, ad wherein if the CD that was just put into the input hopper is of a higher classification than the user has then the CD is "Trapped" in the locked hopper and nothing can be done until the Security manager arrives and begins an investigation, and wherein if on the other hand if everything is OK the CD is destroyed and a printed copy of the event is provided to the user.

The system also includes a system for managing media within a network as described herein using a CD reader and CD writer.

This device is basically a safe for CDs but it blends concepts from other devices/technologies as well.

The system also includes use of a secure disposal container similar to a US Mail box.

The system also includes Bar coding technology.

The system also includes use of access control badge system widely used in industry and government facilities used to control and monitor access.

To store CDs in the dispensing machine, a user would authenticate with their Security access control badge and PIN. The system knows how many blank CD's a user withdrew from the vending machine, along with all the other relevant information regarding the CD. Once authenticated, place the CD (to be stored) in the input hopper and shut the lid (sort of like a US Mail box). The internal bar code reader validates which one of your CD's you're putting into the storage container and then places it in a secure location, by "slot number" inside the container (safe) for later retrieval. The key is that this device, by virtue of its interface with the Central Security System, is that all critical details regarding the status of the CD is audited. The time the user withdrew the CD from the vending machine. The time the CD was actually burned. Date and time it was placed in storage (the Barker-Box) and who did it. More importantly, are the in-between times. Security managers can place "trip-wires" or Boiling Points on how long a CD can remain out of storage. Security Managers can perform audits of Safes to determine if what the systems says is in there is actually there.

DETAILED DESCRIPTION OF THE INVENTION

Figure 1:
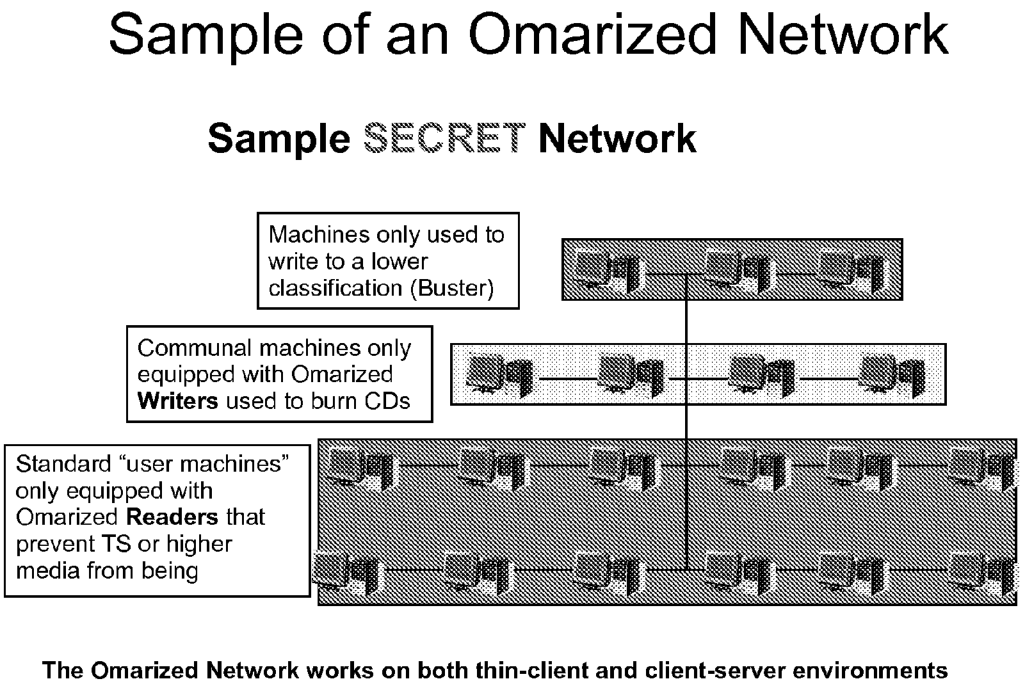
FIG. 1 is a diagram of a sample secret network.

The system blends existing technology to provide the full lifecycle tracking of CD in a classified environment. It uses a vending machine to dispense blank CDs that are pre-labeled and bar-coded for Unclassified, Confidential, Secret, Top Secret, and SCI. The vending machine is tied into a facilities Security Badge system. It is also used in conjunction with a modified CD destruction machine and bar-coding technology. This CD issue-to-destruction method of tracking provides total accounting of CD's. This system is used to counter the "Insider" threat to national security. However, it's enhanced when used with the specialized CD Drives, Writers, the Dispensing Machine and the Network concept.

The system is a classic example of "technology-blending." It blends four commonly used technologies in an innovative and useful way. Those four technologies are:

CD vending machines;

Access control badge system widely used in industry and government facilities used to control and monitor access;

Shredding machines used to destroy all classifications of CDs; and,

Bar-coding technology.

Conceptually, here's how it works. The vending machine is loaded with bar-coded pre-labeled CDs. It would dispense blank CDs labeled as Unclassified, Confidential, Secret, Top Secret, and SCI. To withdraw the CDs users would use their security access badge (tied into the central security system) and PIN to authenticate. For instance, if an employee's badge credentials are only up to Secret, then that person could only withdraw CDs up to that level. Not Top Secret or SCI.

The central security system will keep track of how many CDs any particular employee would have. Keeping track of the date/time of the withdrawal along with what vending machine it was drawn from. Once the CD is no longer needed and must be destroyed then this is where the CD destruction/transfer kiosk comes in.

The employee approaches the destruction/transfer kiosk and authenticates using the security badge/PIN. The system knows what particular CD(s) that employee has and asks which CD they wish to transfer to another employee or destroy. If they wish to transfer it to another employee it'll ask that the other employee to also authenticate (Badge and PIN), and prompts them to place the CD into the bar code reading box. Once the CD is in the box the door locks and the barcode is read. If the new owner doesn't have a high enough security clearance to accept that level of CD the system won't allow the transaction. Note this can be an auditable event. If the person has the appropriate clearance then ownership will be transferred and the kiosk's credit-card-type-printer prints a hardcopy of the transaction for both individuals.

If, on the other hand, the intention is to destroy the CD then the validated owner places the CD in the destruction hopper and shuts the door. The door locks and reads the CD. If the CD doesn't belong to the owner then the door unlocks and the system tells the user who the rightful owner is (with phone number) and instructs them to return it. At this point the system can also generate an automated phone call to the rightful owner telling them that so-in-so just tired to destroy one their CDs. If the CD that was just put into the input hopper is of a higher classification than the user has then the CD is "Trapped" in the locked hopper and nothing can be done until the Security manager arrives and begins an investigation. On the other hand if everything is OK the CD is destroyed and a printed copy of the event is provided to the user.

The Specialized CD Reader & CD Writer.

The specialized CD readers and CD writers (separate devices) work in conjunction with this system. These drives are a blend of existing technology fused together in an innovative way to make computers and networks more secure. Specialized readers will prevent CDs of a higher classification from being read and thus contaminating a system of a lower classification, similar to the Bell-LaPadula and/or Biba security models. These "Read-only" CD drives will ONLY (depending on configuration) accept modified CDs that use either bar-coded CDs or CDs that are laminated (on the label side) with the proximity/magnetic technology, e.g. technology found in keychain fobs at gas stations where a sensor and allows fueling a car and charges a credit card. The specialized CD readers only allow CD's of equal or lower classification to be read. The specialized CD writers only allow CD's to be written to CD that is coded (using the aforementioned barcode or proximity/magnetic stuff) with the same classification. This prevents information from being written to incorrectly marked media.

Conceptually, here's how the "readers" work. In this scenario ("option-one") ALL readers will only accept specially manufactured CDs with either the bar coding or the proximity/magnetic technology on the label side. The outside is where the security selection configuration settings are preferably located. However, due to manufacturing constraints that feature, may be on the backside (not readily accessible).

The drive is configured to the highest security classification level of the system. For this scenario the drive is configured to accommodate a system that processes SECRET information. To better explain this I'll associate each classification with the following numbering scheme; 1=Unclassified, 2=Confidential, 3=Secret, 4=Top Secret, and 5=SCI.

When one of the aforementioned specially manufactured CDs (a Secret one for example) is placed into the CD reader the label reading mechanism reads the label and if it finds that it's "3" or lower (>4), then it'll allow the laser to switch on and read the CD. However, if the label reader detects a "4" (Top Secret) or higher (<4), then the CD reader will activate the eject mechanism and the drive ejects the offending CD. This'll happen each time eject, eject, eject! The laser WILL NOT activate unless it detects a "3" or lower (>4). At this point I may add an optional audible 10 second buzzer that announces the fact that some knucklehead just tried to contaminate the system with data of a higher classification. The aforementioned "option one", as described must be considered carefully because if the label reader senses nothing, no number at all, the same eject condition will occur preventing users from reading non-approved CDs. This "option-one" feature prevents older legacy CDs from being read. This may not be suitable for every environment. However, Option-one is just that, an option. The CD reader will also come with an optional independent (or linked to the system audit trail) onboard mini "black box" that notes the date and time of such negative events.

The specialized CD writers are similar to the readers. Like the readers, they must be configured and the configuration setting set and "sealed" to highest classification level of the system. Again, the label reading mechanism reads the label first. If the blank CD (to be written) is not of the exact classification of the system then the eject mechanism is evoked and a 10 second buzzer is activated. If the label reader does not detect any number at all, then the same eject/buzzer condition occurs. This prevents someone from writing to blank CD brought from home. It's critical that only the specially manufactured bar-coded proximity/magnetic CDs are used. This way they can be tracked by a CD-lifecycle Tracking system. Like the CD reader, this CD writer can be fitted with an optional independent onboard "black box" that audits all eject/buzzer events. A more complex version may actually tie such auditable events into the main-system audit trail, as well as the fact that CD number 3451749 was written to or "burned" date and time.

The "Dispensing Machine".

The specialized reader prevents data of a higher classification from contaminating a system of a lower classification. The specialized writer prevents data from being written to the wrong level of media. It's important to note that a few tightly controlled machines should be equipped with standard drives. These are only used for someone to write to a lower classification. Only individuals who are "Certified" in this process should have permission to logon. Example: Occasionally there are situations where an unclassified file resides on a SECRET machine and it must go through the approved process (i.e. Toolbox-BUSTER software) to get the file off of the high-side and onto the low-side.

To help the reader understand how the whole concept works, an example is provided of the Specialized network shown in FIG. 1.

The Storage Container

In another aspect, there is provided a device that is basically a safe for CDs but it blends concepts from other devices/technologies as well, with deposits similar to a US Mail box, tracking such as Bar coding technology, and security badges using an access control badge system widely used in industry and government facilities used to control and monitor access. To store CDs in the Dispensing Machine a user would authenticate with their Security access control badge and PIN. The system knows how many blank CD's a user withdrew from the vending machine, along with all the other relevant information regarding the CD. Once authenticated, place the CD (to be stored) in the input hopper and shut the lid (sort of like a US Mail box). The internal bar code reader validates which one of your CD's you're putting into the storage container and then places it in a secure location, by "slot number" inside the container (safe) for later retrieval.

The key is that this device, by virtue of its interface with the Central Security System, is that all critical details regarding the status of the CD is audited. The time the user withdrew the CD from the vending machine. The time the CD was actually burned. Date and time it was placed in storage (the storage container) and who did it. More importantly, are the in-between times. Security managers can place "trip-wires" or Boiling Points on how long a CD can remain out of storage. Security Managers can perform audits of Safes to determine if what the systems says is in there is actually there. When it comes to withdrawing the CD from the container to use or to destroy, the user would authenticate/PIN and select the CD they want and the system would issue it, audited of course. Like the vending machine, the storage container won't issue a CD of a higher classification to someone who doesn't have the clearance. Other options may include the capability add an unclassified label or tag to a specific "slot number" to remind the owner of what the CD is for. Example, Slot #15 Sgt Jones' case files June 2003-August 2005.

It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A method for managing and controlling storage media within a secure environment, comprising the steps of:

accessing a dispensing machine, through a user presenting an electronic security access badge, authenticating said electronic security access badge of the user at the machine, wherein the electronic security access badge contains information relating to the users security clearance level;

dispensing, via said dispensing machine, a CD to the user, the CD having a tracking device on or within the CD, wherein said tracking device contains information that restricts the use of the CD to a specific security clearance level and wherein the tracking device is tied to a central security system computer that controls transactions involving the electronic security access badge and the CD, and wherein said CD is restricted to a specific security level that corresponds to the security level obtained via the authenticating of the electronic security access badge, and electronically ties the CD to the electronic security access badge of the user, wherein the central security system computer gathers and stores information relating to the CD that is tied to the electronic security access badge;

restricting access to the CD, via a special CD reader or CD reader/writer in a user's local computer, wherein the CD reader or CD reader/writer is only able to read or write to the CD if the security level gathered from the tracking device by the CD reader or CD reader/writer corresponds to a security level of the user obtained from the CD reader or CD reader/writer;

and collecting, via a different machine, the CD from the user when the CD is no longer being used by the user, wherein the step of collecting comprises untying, via the central security system, the CD from the electronic security access badge of the user;

and disposing of the CD, wherein the step of disposing comprises an action selected from the group consisting of physically destroying the CD, transferring the CD to a second user using the process of authenticating and tying the CD to the security access badge of the second user, and storing the CD in a secure storage container for later retrieval, wherein the different machine performs the disposing.

2. The method of claim 1, further comprising the step of generating an audit report that contains information including the number of CDs tied to an electronic security access badge, the time and date that the CD was dispensed, and the security clearance level which is authorized for the CD or the user's electronic security access badge.

3. The method of claim 1, wherein the security clearance level is selected from the group consisting of unclassified, confidential, secret, top secret, and SCI, and combinations or equivalents thereof.

4. The method of claim 1, wherein the step of dispensing occurs at a CD vending machine within a secure facility.

5. The method of claim 1, wherein the steps of authenticating the electronic security access badge and authenticating the CD and electronically tying the CD to the electronic security access badge of the user further comprises entering a PIN.

6. A system for managing and controlling storage media within a secure environment comprising a dispensing machine through which a user presents an electronic security access badge to be authenticated, wherein the electronic security badge contains information relating to the users security clearance level, wherein the dispensing machine dispenses a CD to the user, the CD having a tracking device on or within the CD, wherein said tracking device contains information that restricts the use of the CD to a specific security clearance level;

a central security system computer that controls transactions involving the electronic security access badge and the CD, and wherein said CD is restricted to a specific security level that corresponds to the security level obtained via the authenticating of the electronic security access badge, and electronically ties the CD to the electronic security access badge of the user, wherein the central security system computer gathers and stores information relating to the CD that is tied to the electronic security access badge;

a special CD reader or CD reader/writer for restricting access to the CD, wherein the special CD reader or reader/writer is connected to a user's local computer, wherein the CD reader or CD reader/writer is only able to read or write to the CD if the security level gathered from the tracking device by the CD reader or CD reader/writer corresponds to a security level of the user obtained from the CD reader or CD reader/writer;

a CD collection machine for collecting the CD from the user when the CD is no longer being used by the user, and wherein the collection machine unties the CD from the electronic security access badge of the user by communicating with the central security system, and wherein the CD collection machine disposes of the CD, wherein disposing comprises an action selected from the group consisting of physically destroying the CD, transferring the CD to a second user using the process of authenticating and tying the CD to the security access badge of the second user, and storing the CD in a secure storage container for later retrieval.

* * * * *